United States Patent Office 3,099,388
Patented July 30, 1963

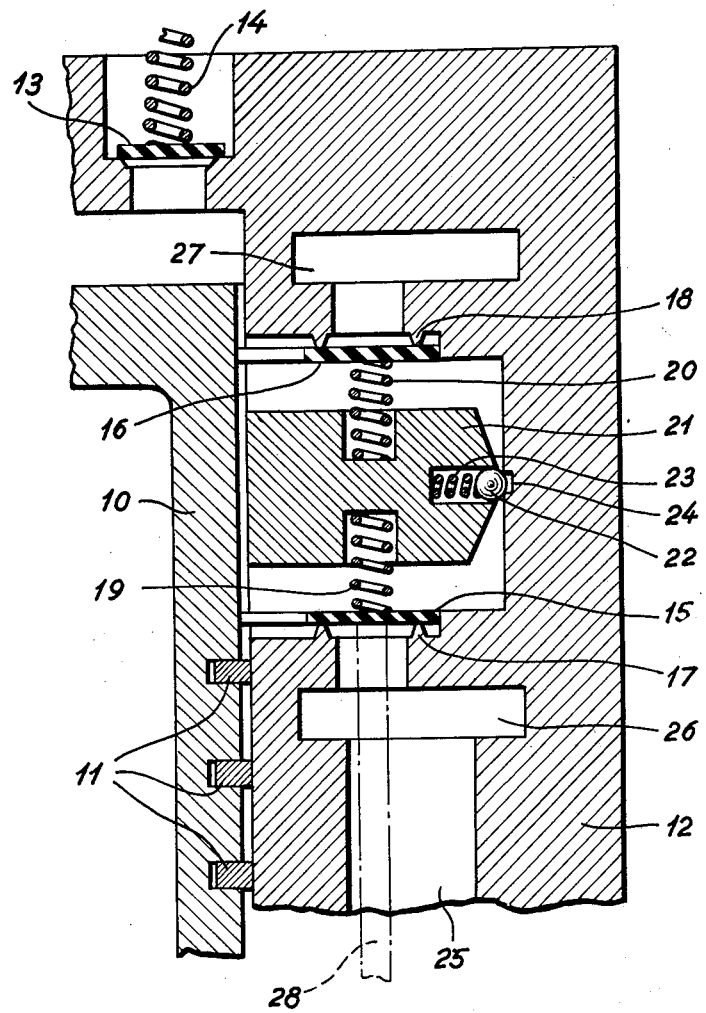

3,099,388
ARRANGEMENT OF THE INLET VALVES IN PISTON COMPRESSORS
Vagn Hovgaard Villadsen, Aarhus, Denmark, assignor to Aktieselskabet Thomas Ths. Sabroe & Co., Aarhus, Denmark, a Danish joint stock company
Filed July 5, 1960, Ser. No. 40,626
4 Claims. (Cl. 230—228)

This invention relates to an arrangement of the inlet valves in high speed piston compressors including annular valve plates, the planes of which are perpendicular to the axis of the cylinder, said plates preferably being disposed in the wall of the cylinder, valve springs being provided to urge the valve plates against their seats. Such inlet valves with plate rings permit the valves to follow any great number of revolutions of the compressor due to the light weight of the rings so as to open and close on the desired moments and in a satisfactory way.

When the capacity of the compressors and thus the size of the cylinders are increased, a single plate ring will become too large and impractical, and therefore, it has previously been suggested to make use of two or more plate rings in each inlet valve. However, the plate rings have been arranged in a common plane and concentric to one another whereby the radial dimension of the compressor was unduly increased, and the length of the path of flow from the cylinder to the different plate rings would be different and besides, the noxious space will be increased whereby the effectivity of the suction stroke would be affected.

With a view to meet the above mentioned disability, it has also been proposed to arrange the valves in the cylinder wall with the axes thereof extending at a right angle to the axis of the cylinder, or with other words with the valves being parallel to the cylinder wall. However, such performance has shown to be undesirable for different reasons, such as a great valve wear. Consequently, the invention starts from valves of the first mentioned kind having the plate rings of the valves lying in planes at a right angle to the cylinder axis and preferably provided in the cylinder wall, but the inlet valves may also be arranged in the top of the cylinder, if preferred. Whether one or the other arrangement be selected, and whether the pressure valves are positioned at the top or in the wall of the cylinder together with or separated from the inlet valves, are questions to be solved in connection with the special construction of the compressor proper.

The purpose of the invention is, in accordance with the above, to arrive at an inlet valve in which the use of a number of plate rings does not involve unduly increased dimensions of the compressor or of the noxious space, and to this purpose the arrangement of the invention is characteristic in that each inlet valve pertaining to an end of the cylinder, comprises two plate rings being axially offset in relation to one another in the direction of the cylinder axis, and in that the valve springs of said plate rings are abutting against an auxiliary ring which is located between the plate rings, and which is axially slidable. Thus, the rings will be substantially opposed to one another and when in closed position will be urged away from each other and against their seats by means of interposed springs. Due to the fact that a common passage can be used leading to the seats of the plate rings from the interior of the cylinder, the same pressure will be acting upon the plate rings at any time to cause them to open and close simultaneously, and the rings will be positioned at the same distance from the inner surface of the cylinder with the result that the flow conditions for each of the plate rings are alike.

In practice the interposed springs may have somewhat different strength, and the result of such difference will be substantially eliminated by the inertia of the axially slidable auxiliary ring. Further to the compensation of said difference, if any, of the spring strength, the auxiliary ring fills out part of the space between the plate rings whereby the noxious space is diminished and the suction effect is increased.

In the case that the compressor is arranged to be relieved during the start thereof, by preventing the inlet valve to move on to its seat, the auxiliary ring is especially favourable if only one of the plate rings is operated to be lifted. During the compression of the springs at either side of the auxiliary ring, the latter will be moved away from said valve seat a distance which is twice that existing during the running of the compressor, whereby an ample flow area will be provided for during idle running so that the flow resistance and thus the development of heat will be greatly reduced. However, when the relief period is then abolished, the auxiliary ring might oscillate in a rather long time before the proper central position between the plate rings of the valve is established, and accordingly a further development of the invention may include the arrangement that the axially slidable auxiliary ring is provided with means for releasably holding said ring in an axially central position between the valve seats of the plate rings. Thus, the auxiliary ring can also be prevented in oscillating movements during the normal running of the compressor in case that any difference should exist or arise in the flow conditions of the two plate rings of the valve.

The invention will be closer explained in the following description with reference to the drawing, on which an example is shown of an arrangement of an inlet valve in accordance with the present invention.

On the drawing, the inlet valve is shown in association with a compressor, only a piston 10 thereof being shown which is provided with piston rings 11 in the usual manner, and which is reciprocated within a cylinder 12. At the top of the cylinder a pressure valve includes a valve plate 13 being urged against its seat by a spring 14, but for the rest the construction of said pressure need not be further explained.

In the vicinity of the cylinder top, an inlet valve according to the invention is placed in the wall of the cylinder. If the compressor in question is double-acting, a similar inlet valve can be provided at the other end of the cylinder, not shown. The inlet valve is composed of two plate rings 15 and 16, the planes of which are at a right angle to the axis of the cylinder, and the rings are axially offset and opposed to one another. Preferably, the inner and outer diameters of the plate rings are equal so that at all times the two rings are subjected to the same impulse from the pressure prevailing above the piston in the cylinder. The plate rings are urged against their seats 17 and 18 by springs, 19 and 20 resp., abutting against an auxiliary ring 21 disposed within the space defined by the plate rings, whereby said springs tend to move the plate rings away from one another and towards the closed position of the valve.

The auxiliary ring 21 fills out a large portion of the space between the two plate rings of the valve, and the springs 19 and 20 have substantially the same strength to assist in holding the auxiliary ring in a central position between the seats 17 and 18 for the plate rings. With a view to releasably keep the auxiliary ring in the central position, one or more balls 22 can be inserted in the outer periphery of the auxiliary ring, as shown, and each ball can be urged outwardly by a spring 23 to engage a groove 24 provided in the cylindrical inner surface of the space between the plate rings. In lieu of the ball, other means may be utilized, such as a bolt having a rounded extremity, or a recess or groove may be provided in the auxiliary ring for receiving a retaining means inserted in the material of the cylinder wall.

During the movement of the piston 10 towards the top of the cylinder, the pressure valve 13 is open, whereas the plate rings 15 and 16 of the inlet valve are held against their seats during the compression stroke. During the movement of the piston away from the cylinder top, the suction effect will close the pressure valve and will lift the plate rings 15 and 16 against the force of the springs 19 and 20, whereby working fluid will be drawn into the cylinder. Said working fluid is supplied through a supply passage 25 and is similarly distributed to the plate rings through the branch passages 26 and 27.

When starting the compressor it can be relieved by raising the inlet valve from its seat. The relieving operation can be automatically performed in response to the pressure as developed by the compressor, said pressure actuating a device in a suitable way, e.g. a stem 28, to move the same in a direction parallel to the cylinder towards the top of the latter to thereby lift the lower plate ring 15 which is located in the usual way as known from compressors. Such method of relieving a compressor is known per se. However, the inlet valve according to the invention has a further advantage due to the fact that the retaining means 22, 23 and 24 is released by the one-way pressure from the stem 28 to allow the auxiliary ring 21 to be moved in the direction of the cylinder top. The springs 19 and 20 will be equally compressed, and at the time when the lower plate ring 15 has moved to engage the lower side of the auxiliary ring, the upper surface of the auxiliary ring will be in engagement with the upper plate ring 16. Hereby the distance between the auxiliary ring 21 and the lower plate ring 15 will be twice as large as during normal running, and in the released condition of the compressor the working medium will thus flow in one or the other direction through the valve without essential resistance e.g. the relief is extremely effective and requires less power consumption than by the employment of the previously known inlet valves.

I claim as my invention:

1. A reciprocating piston fluid compressor including a cylinder having inlet and outlet valves for fluid to be compressed, an inlet valve at one end of said cylinder including a pair of ring valve plates concentric to and lying in planes at a right angle to the axis of said cylinder, the wall of which is arranged to define a cavity for receiving said pair of plates, an auxiliary abutment ring within said cavity between said pair of valve plates and defining a pair of spaces on opposite sides of said abutment ring facing either of said valve plates, and compression springs on opposite sides of said abutment ring tending to urge said valve plates against their seats and to keep said ring floating intermediate said valve plates.

2. A reciprocating piston fluid compressor comprising a cylinder and at least one fluid inlet valve consisting of a pair of annular plates in axially spaced parallel planes at a right angle to the and concentric with the axis of said cylinder and disposed within the wall thereof, said cylinder defining a recess for receiving said plates and constituting seats for said plates, an auxiliary abutment ring disposed between said plates and defining a pair of spaces on opposite sides of said abutment ring facing either of said valve plates, springs respectively arranged between said ring and valve plates, and means for resiliently holding said ring intermediate said valve plates.

3. A reciprocating piston fluid compressor comprising a cylinder including, adjacent one end thereof, fluid inlet valve in turn including a pair of ring-shaped valve plates, the wall of said cylinder defining a cavity which is open against the inner surface of said cylinder wall and has a pair of axially spaced parallel sides, the planes of which extend at a right angle to the axis of the cylinder, valve seats in said sides facing one another, an auxiliary ring within said cylinder wall cavity between said valve seats and defining a pair of spaces on opposite sides of said abutment ring facing either of said valve plates, compression springs between each of the valve plates and said intermediate auxiliary ring, and resilient spring means tending to hold said auxiliary ring in a substantially central position between said valve plates, a valve lifting device adapted to be moved in a direction parallel to the cylinder axis to lift one of said valve plates from its seat to thereby compress said compression springs while moving said auxiliary ring away from its central position against the action of said resilient holding means.

4. A high speed fluid compressor comprising a cylinder and a piston reciprocating therein, inlet and outlet valves for fluid to be compressed, each of said inlet valves comprising a pair of axially spaced valve seats and a pair of ring-shaped plates concentric to the axis of said cylinder and axially spaced in relation to one another to define a space between said valve seats, the planes of which are at a right angle to the axis of said cylinder, an annular abutment member concentric to the axis of said cylinder within said space intermediate said pair of valve plates, and compression springs extending from opposite sides of said abutment member and tending to bias said valve plates against said valve seats, said abutment member being axially slidable in response to unequal forces on the opposite sides thereof.

References Cited in the file of this patent

UNITED STATES PATENTS

| | | |
|---|---|---|
| 554,604 | Morgan | Feb. 11, 1896 |
| 1,012,725 | Shadall | Dec. 26, 1911 |
| 1,088,264 | Windeler | Feb. 24, 1914 |
| 1,955,007 | McClay | Apr. 17, 1934 |
| 2,955,749 | Tomkowiak | Oct. 11, 1960 |